United States Patent [19]

Rickard

[11] 4,086,442

[45] Apr. 25, 1978

[54] REPERTORY DIALLERS

[76] Inventor: Bryan W. Rickard, 19667 Valley View Dr., Topanga, Calif. 90290

[21] Appl. No.: 681,076

[22] Filed: Apr. 28, 1976

[51] Int. Cl.$^2$ .......................................... H04M 1/45
[52] U.S. Cl. .............................. 179/90 CS; 235/444
[58] Field of Search ....... 179/90 CS, 90 AD, 6.3 CC; 235/61.11 A, 61.11 D, 61.12 C, 61.12 N, 61.12 M

[56] References Cited

U.S. PATENT DOCUMENTS

| | | | |
|---|---|---|---|
| 2,537,974 | 1/1951 | Devaux | 179/90 CS |
| 3,159,820 | 12/1964 | Oden | 179/90 CS |
| 3,666,925 | 5/1972 | Marcus | 235/61.11 C |
| 3,736,410 | 5/1973 | Ragland et al. | 179/90 CS |
| 3,784,793 | 1/1974 | Ito et al. | 179/90 CS |

*Primary Examiner*—Kathleen H. Claffy
*Assistant Examiner*—Gerald L. Brigance

[57] ABSTRACT

The present invention is a repertory telephone dialler in which the telephone numbers are stored on cards. Each card is assembled from individual pieces each representing one digit of the telephone number. Each card can be disassembled to rearrange or replace the pieces, to represent a new telephone number. Each card is equipped with a handle and a surface for recording the name of the party whose telephone number it represents. Dialling is performed by inserting the card into a console. The console is equipped with receptacles for holding a plurality of cards ready for use. The console includes electronic means for sending dialling signals to the telephone exchange, for muting dialling pulses, and for disconnecting the power source when dialling is complete.

20 Claims, 10 Drawing Figures

REPERTORY DIALLERS

BACKGROUND

When a telephone is often used to dial the same numbers, it is tedious to manually dial the complete telephone number every time a call is made. Various apparatus have been described which dial such numbers automatically, upon pressing a button, or upon inserting a card into a slot. These apparatus are known as repertory diallers.

Other benefits of repertory diallers include a reduction in the mental and physical effort involved in memorising or finding the telephone number of the called party in a directory, elimination of wrong numbers reached by manual misdialling, and increased ease of telephone use by young, old, and infirm persons, who may find it difficult or impossible to dial intthe customary way.

Known repertory diallers include apparatus in which a telephone number is selected and dialled by pressing one of a plurality of buttons, or by moving a control to one of a plurality of positions, and pressing a single button. Such repertory diallers have a fixed capacity of telephone numbers which can be stored.

Other known repertory diallers use coded cards which are inserted into an apparatus to initiate dialling of the telephone number coded on the card. Such devices are called card repertory diallers. Such diallers are not limited in capacity. Known means for coding such cards include the removal of perforated regions, and insertion of pieces of wire into the cards.

DRAWBACKS OF KNOWN REPERTORY DIALLERS

Known repertory diallers have one or more of the following drawbacks, which detract from their optimum utility.

(a) All known means for coding cards used in card repertory diallers require considerable manual and mental dexterity to accomplish the coding, and are therefore not completely suitable for use by the average domestic telephone user, and are particularly unsuitable for the incapacitated or very young user for whom a repertory dialler would otherwise be beneficial. For example, one known card coding means requires one or two perforated areas to be selected from a group of seven such areas for each digit of the telephone number, and the areas so selected to be pressed with a pointed tool until the perforations break.

(b) Known card repertory diallers have an additional deficiency in that the name of the party whose telephone number is coded on any card is not visible when the cards are stacked together (as they normally would be stored). An alphabetic or other type of card-storing arrangement is often used to minimise this drawback, but in any case, several cards might have to be inspected before the right one is found.

(c) Known cards used in card repertory diallers do not indicate with visible numerals the telephone number coded thereon (unless the number is specifically noted together with the name of the party represented). In the absence of such visible numerical marking it is tedious to check whether the telephone number coded on the card is current and correct. The absence of such visible numerical marking also makes it harder to accomplish the coding of the card and to check whether such coding is correctly achieved.

(d) Some known repertory diallers also have an electrical deficiency in that they make loud clicks in the earpiece of the telephone, while generating dial signals for use by sequential-dial-pulse switching equipment. Such diallers are described as not "muting" the dial pulses.

(e) Some known repertory diallers consume power even when not being used, thus requiring large batteries or connection to a domestic power source. If such connection is required, there is a possibility that an internal short-circuit may allow hazardous voltages to be applied to the telephone lines, to the danger of telephone company personnel, who habitually regard such lines as non-hazardous, and therefore often touch them. For this reason, good safety practice and telephone company regulations both require that special design and testing requirements are applied to equipment which is connected both to the telephone lines and domestic power sources, thus increasing the expense and complexity of such equipment.

(f) Another deficiency of some known diallers is that if their electronic circuits fail in such a way that an unlimited sequence of digits is dialled, the associated telephone appears to be continuously "busy" to incoming calls, and does not allow outgoing calls to be made, even by use of the regular dial. This failure mode also causes continuous power consumption by the dialler, and ties up switching equipment in the telephone exchange.

(g) A considerable drawback to some known card diallers is that card insertion or withdrawal must take place at a particular speed, within certain limits. This precludes purely manual means for such insertion and withdrawal, because it is not practical to sufficiently control the speed of manual operations. For this reason, such diallers use a motor or spring mechanism with governed speed of operation, to insert or eject the card, thus introducing complexity and cost into the device.

(h) Repertory diallers which do not use cards are limited in capacity.

The subject of the present invention has none of the above-listed drawbacks, as will become apparent by study of the following paragraphs.

SUMMARY OF THE INVENTION

The present invention is a card repertory dialler and is therefore not limited in capacity. In contrast to prior art, however, the cards consist of several parts, namely, a frame, including a convenient handle and a place for the name of the party whose telephone number the card represents, and a plurality of number-blocks, each of which represents one digit of the telephone number. (In this document, the word "number-block" will be used exclusively to describe such parts). The number-blocks are separate parts, which can be individually removed from the frame or rearranged within the frame.

Each number-block is conspicuously marked with the single digit which it represents. There are ten different configurations of number-block, representing the digits 0-9. The number-blocks can be inserted into the frame and restrained so that they do not fall out in use. However, they can be removed, replaced or rearranged at any time by a conscious action to disable the restraint. The frame and the number-blocks can be re-used to assemble different telephone numbers as many times as desired, thus effecting economy in the use of the parts.

A telephone number is assembled in the frame by successively inserting number-blocks representing the consecutive digits of the telephone number. As the telephone number is assembled, the digits marked on each number-block become situated adjacent to one another in such a way as to conspicuously display the successive numerals comprising the telephone number, in their correct sequence. This feature is a considerable aid to accurate and rapid assembly of the card, and when assembly is complete, the entire telephone number is clearly displayed and can be checked for accuracy. The simplicity of the assembly process overcomes deficiency (a) listed above. At any subsequent time, the telephone number is observable and can be conveniently checked to determine whether it is still current. This feature overcomes deficiency (c) listed above. It is emphasised that this numerical display of the telephone number results automatically from the assembly of the card. No conscious action by the user is required to record the number.

In addition to the numerical indication of the digit represented by a number-block, the number-block also includes a representation of that digit in coded form, suitable for sensing by automatic means.

This repertory dialler also includes an assembly into which a selected card is inserted, in order to dial a telephone number. In this document, the word "console" will be exclusively used to describe such assembly.

The major parts of the console are the aperture into which the selected card is inserted, a rack in which a plurality of cards may be stored, a means for sensing the codes on the card, a means for storing the telephone number after it has been sensed and before it is transmitted, a means for converting the coded form in which it is sensed to the different coded form in which it is transmitted, and a means for automatically transmitting the number to the telephone exchange. (The expression "telephone exchange" is herein used to describe switching equipment in a telephone company central office, PBX, telex, TWX, or other communications network control equipment, trunk switching equipment, or any other equipment to which a short sequence of numbers may be sent). The parts of the console may be configured as a single assembly or as physically separate parts.

The means for transmitting the telephone number includes means for muting dialling clicks (if pulse-train dialling is used), thus overcoming deficiency (d) listed above.

The console includes means for ensuring that normal telephone connections exist when dialling is not in progress, so that the dialler does not interfere with the other functions of the telephone such as transmitting speech, ringing, and causing a busy signal when appropriate. The console also includes means for automatically disconnecting power from its internal circuits after dialling, (thus overcoming deficiency (e) listed above) and for disconnecting power and restoring telephone connections to their normal state if an internal malfunction causes dialling to continue after it should have stopped (thus overcoming deficiency (f) listed above).

Cards used in the present invention, though being more bulky than some previously known, use their size to advantage, by allowing an identification area to be situated on top of the card. This area can be arranged to make a large angle with the long axis of the card, so that it is visible when the cards are stacked together. Such cards may be stacked in a rack, or similar holding device, with all the names clearly visible at one time, thus providing a means for instantly finding the card representing any particular party, thereby overcoming deficiency (b) listed above. Such a rack may be built into the console, for added convenience.

Additionally, the top of the card may be formed into a convenient shape, such as a handle (which may be combined with the identification space), to facilitate handling of the card.

The present invention includes a sensing device and electrical circuits which operate independently of the speed at which the card is inserted or withdrawn. As a result, insertion and withdrawal can be performed manually, thus overcoming deficiency (g) listed above.

It is emphasised that although the present repertory dialler requires both the console and the cards in order to be used, patent protection is claimed herein on several features of the cards and the console separately, as well as on the combination of the two, as will become apparent later in this document.

SOME POSSIBLE VARIATIONS OF THE INVENTION

A particular embodiment of this invention is described below. It is to be understood that the embodiment described herein is merely illustrative of the principle of the invention. Various modifications thereto may be made by persons skilled in the art without departing from the spirit and scope of the invention.

In particular, the described electrical contact means of sensing the coded telephone number may be altered to photoelectric, inductive, capacitive, or other means by a trivial modification not affecting the scope of the invention.

Additionally, a logical enhancement of the present invention would be to incorporate means for detecting additional dial tones such as are obtained with some PBX systems upon dialling access codes, and pausing in the dialling sequence at the appropriate time until such additional dial tones are detected.

A trivial variation of the present invention would be the substitution of alternative modes of relative motion between the card and the sensing devices, for example by passing it over a sensing surface instead of inserting it into an aperture.

Also, the described sequential pulse dialling means of transmitting a telephone number to the telephone exchange may be a trivial modification, not affecting the scope of the invention, be changed to tone-frequency or any other means of transmission which might be appropriate now or in the future.

Another version of this invention uses a card in the form of a cylinder, on which the number-blocks, instead of being removable, are fixed along the axis of the cylinder. (The meaning of the word "card" as used in this document is hereby extended to include such cylinder and related forms.) In this version, each number-block is a short cylinder or toroid, which can be rotated about the axis of the cylinder into one of ten positions, corresponding to the digits 0 – 9. The numerals 0 – 9 are clearly marked around the circumference of each number-block. The cylinder is equipped with windows or other means of indicating the selected numeral on each number-block, when the number-blocks are each individually rotated to selected positions to that they collectively represent a desired telephone number. Coded contacts or other means of causing the coded telephone number to be sensed by the console are included on each number-block.

The advantage of this version is that the number-blocks cannot be lost or used up. They are always in place and can quickly be rotated to a new set of positions.

A variation of this version uses a planar card in which the number-blocks are not removable, but can be moved into one of ten positions to represent the ten different digits.

DESCRIPTION OF AN ILLUSTRATIVE EMBODIMENT

In this embodiment, the means of differentiation of the number-blocks representing different digits is the shape of electrically-conducting areas on one surface of said number-blocks. The console contains a row of contacts accurately mounted so that said conducting areas pass over the contacts, making electrical connections thereto, as the card containing said number-blocks is inserted into said console.

It is pointed out that within this illustrative embodiment there are certain features and innovations which, while not essential to the practical implementation of the general principles described earlier, are nevertheless desirable and necessary for optimum operation of this embodiment. Such features and innovations are described in the course of the following description and patent protection is claimed thereon later in this document.

Reference is made to the accompanying drawings, as listed below:

FIG. 1 Perspective views of a coded card. (*a*) Front (*b*) Back.

FIG. 3 The ten number-blocks. (*a*) Front (*b*) Back

Figure 1A:
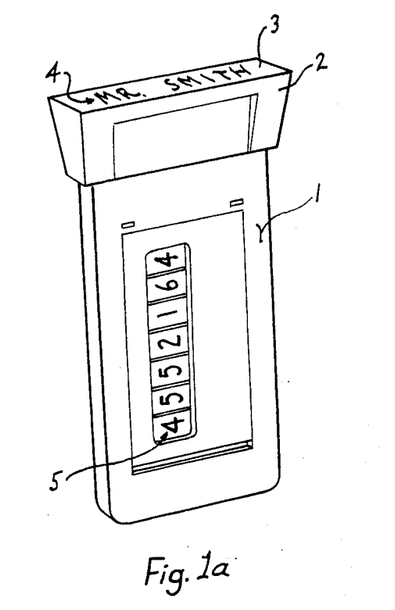
Figure 1B:
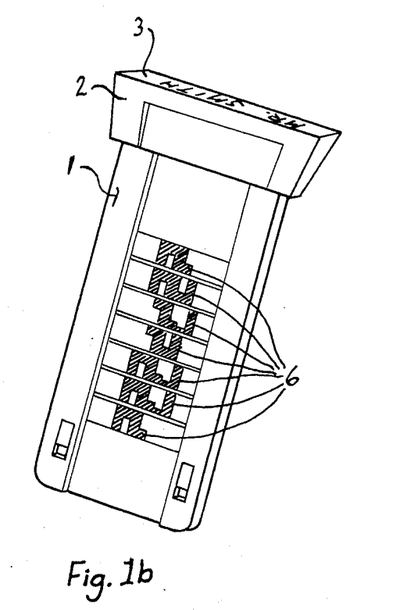

FIG. 1 shows a front and a back view of a typical card 1. (All parts are identified in this and subsequent figures by unique numerals, the same numerals being used in all views and figures to indicate the same parts). The top 2 of the card is shaped like a handle, so that it can be conveniently picked up from its receptacle and inserted into the console with the thumb and fingers of one hand. The upper surface 3 of the top has a suitable finish for writing or otherwise identifying the name 4 of the party whose telephone number is coded on the card. It is pointed out that the surface 3 makes a substantial angle with (i.e. is approximately perpendicular to) the plane of the card and is therefore visible when the cards are stacked or stored in a rack.

The telephone number coded on the card is clearly visible as a sequence of numerals 5 when looking at the front of the card (Although a seven-digit number is shown, telephone numbers of other lengths can clearly be accomodated by using different length cards).

At the back of the card may be observed the conducting areas 6 comprising the coding and other functions related to the electrical operation of this embodiment.

Figure 2:
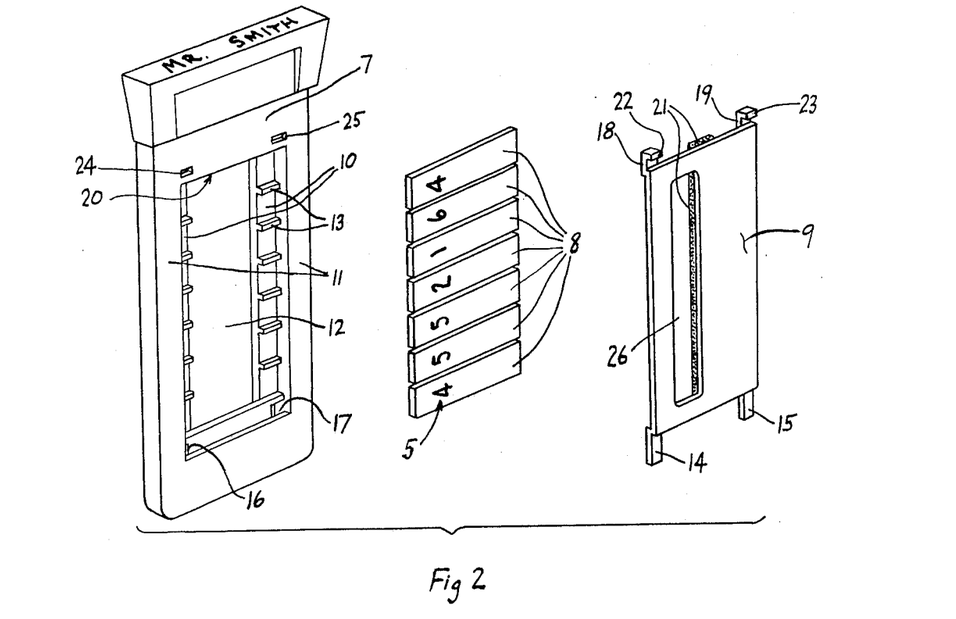
FIG. 2 Exploded view of card.

Further details of the card may be ascertained by observation of FIG. 2, together with the following description.

The card consists of a card body 7, a plurality of number-blocks 8, and a cover 9.

The number-blocks are rectangular blocks of uniform size and thickness. The only features on the front side thereof are the conspicuous numerals 5. On assembly of the card, each number-block is placed in a recess in the card body 7. A typical recess is shown at 10 in FIG. 2. The recesses are bounded by the two sides 11 of the card body but the space 12 between the two sides 11 is open, so that the back of the number-blocks is visible and tangible at the back of the card. Each recess 10 is provided with stops 13 to prevent number-blocks departing significantly from a position parallel to the top and bottom of the card.

Assembly of a card is completed by insertion of the cover 9. The cover has two lower tabs 14, 15, which pass into holes (16, 17, respectively) in the card body. The tabs can be inserted far enough into the holes that two upper tabs 18, 19 on the cover can pass below the upper boundary 20 of space 12.

Resilient material 21, which is attached in a strip running from top to bottom of the cover, exerts pressure on the number-blocks as the cover is inserted.

The cover is locked in place by pushing it up, relative to the card body, so that the upper tabs pass into holes in the upper boundary 20. The upper tabs are equipped with projections 22, 23, which are pushed into holes (24, 25 respectively) in the card body by the resilient force of material 21, upon sufficient upward movement of the cover to locate the projections opposite the holes. This action locks the cover in place. It can then only be removed by the conscious act of pushing the top of the cover in until the projections 22, 23 are moved out of the holes 24, 25, and then moving the cover down until tabs 18, 19 appear below boundary 20.

The parts are suitable dimensioned so that number-blocks 8 are held securely in place by the force of material 21 with the numerals 5 visible through an aperture 26 in the cover. Other means of restraining number-blocks in their correct positions can clearly be devised without departing from the scope of this invention.

Figure 3A:
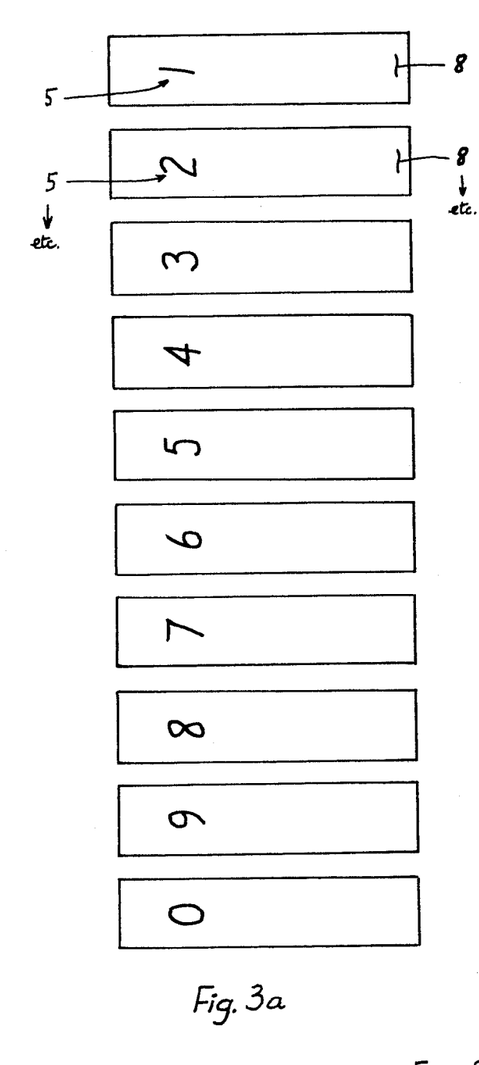
Figure 3B:
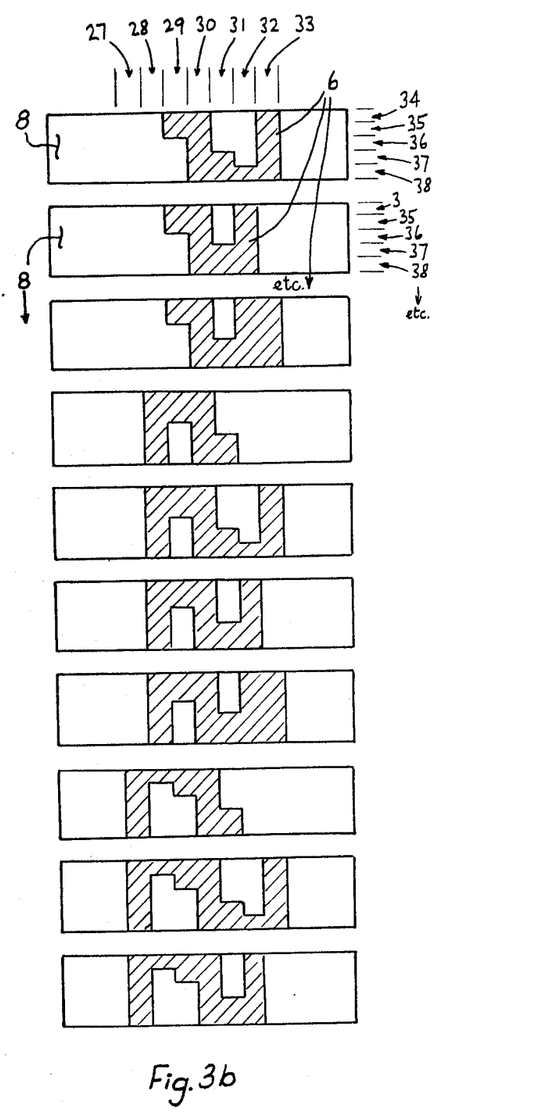

FIG. 3 shows the number-blocks 8 indicating the electrically conducting areas 6 on one surface, which are configured to differentiate the ten number-blocks representing the digits 0 – 9. The area which may be conductive is divided into 35 regions, defined by seven columns 27 – 33, each having five functional sections, or rows (34 – 38).

All number-blocks have a continuous conductive surface over the whole of column 30, the parts of column 29 in rows 34 and 35, and the parts of column 31 in rows 37 and 38. Columns 27, 28, 32 and 33 have or have not, continuous conductive surfaces, as a function of the digit represented, as indicated in FIG. 3. In the case of those digits where column 27 has, and column 28 does not have, a continuous conductive surface, column 28 has a conductive surface only in row 34. In the case of those digits where column 33 has, and column 32 does not have, a continuous conductive surface, column 32 has a conductive surface only in row 38. The purpose of the surfaces described in the preceding two sentences is to ensure electrical connection between column 30 and column 27, in the first case, and between column 30 and column 33, in the second case, thus providing that the conductive region is contiguous in each of the 10 different configurations.

The reasons for this particular combination of configurations will become apparent when the electrical function of the device is explained.

FIG. 3 also shows the conspicuous numerals 5 on the front side of the number-blocks.

Figure 4:
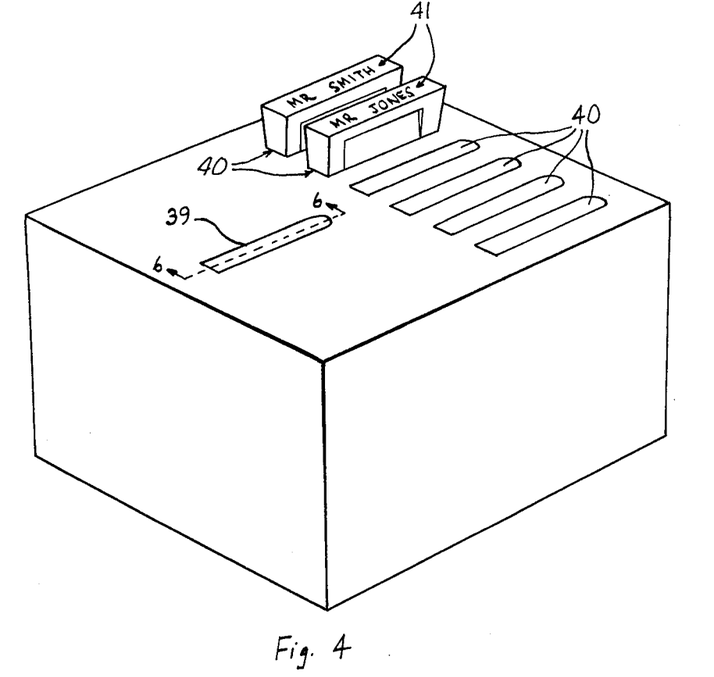
FIG. 4 Perspective view of the console

FIG. 4 shows the main physical features of the console. They include an aperture 39, into which the card 1 is inserted for dialling, and receptacles 40 for storing cards ready for use in such a way that the identification 41 of each card is clearly visible.

Figure 5:
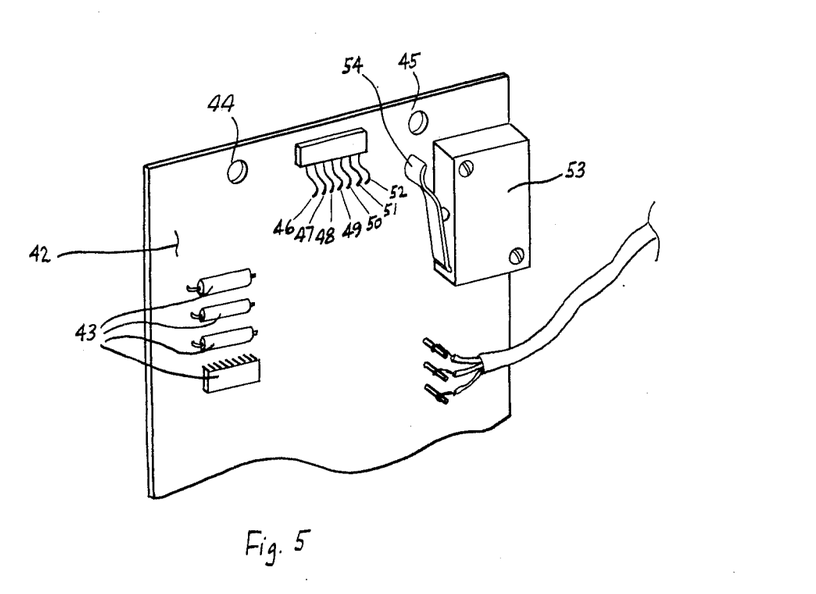
FIG. 5 Perspective view of the mechanical parts of the circuit card.

FIG. 5 illustrates a circuit card 42 which is mounted inside the console. It contains the electronic components illustrated by parts 43, which perform functions described later in this document. It also includes mounting holes 44 and 45 to attach it to the console, a row of seven contacts 46 – 52, and a switch 53, actuated by a lever 54.

FIG. 5 also shows the three-conductor cable by which electrical connection is made with the telephone instrument and telephone exchange.

Figure 6:
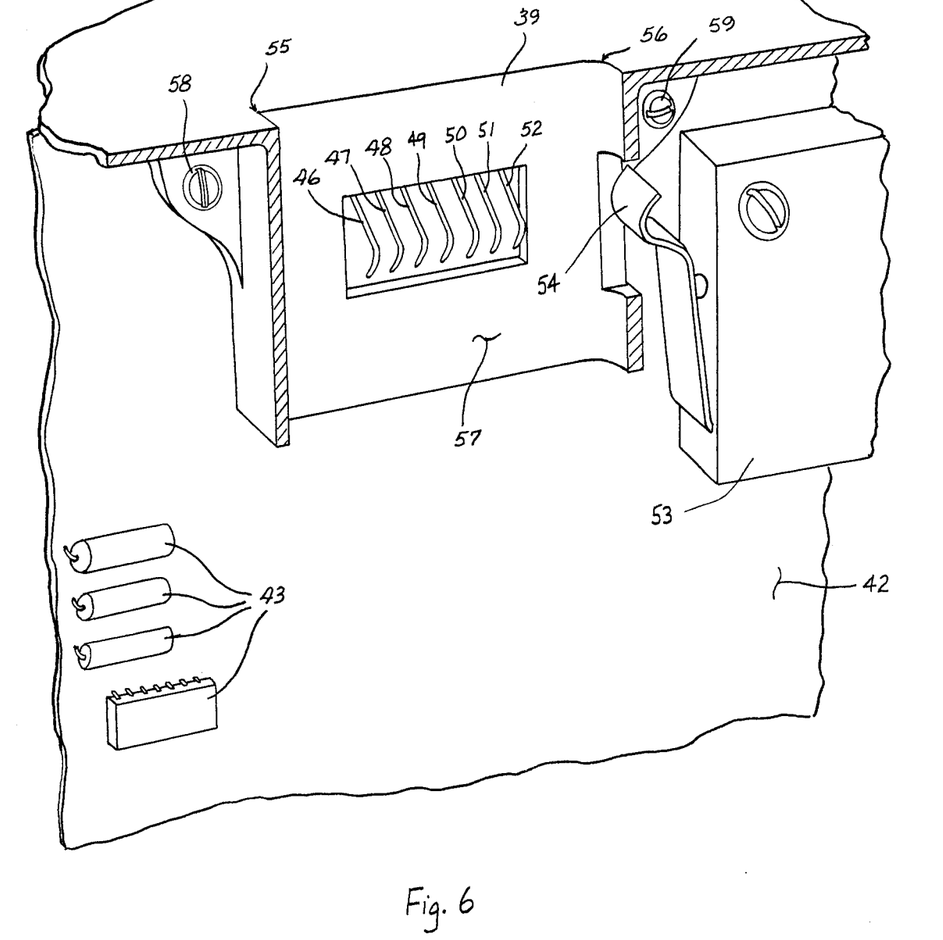
FIG. 6 Sagittal section through the aperture of the console.

FIG. 6 shows the circuit card 42 as it is mounted in the console. For clarity, the console is shown in a sagittal cross-sectional view through the axis of the aperture 39.

Aperture 39 is configured with a sharp corner 55 at one end and a rounded section 56 at the other end. The cards 1 are shaped the same way, so that they can be inserted into the aperture in only one orientation.

Aperture 39 is extended to form a guide 57 for the card, so that as it is inserted into the aperture, it is constrained to move in a particular direction.

The contacts 46 – 52 are positioned so that as a card 1 is inserted into the console, each contact makes electrical contact with one (and only one) column 27 – 33 of any row 34 – 38 of any number block 8 on the card essentially simultaneously. After making contact with one row, as the card is inserted further into the console, the contacts make contact with the next row, and so on, until all the rows 34 – 38 of all the number-blocks 8 have been successively contacted by contacts 46 – 52.

Although exact simultaneity of making and breaking contact with the seven columns of any row is practically impossible, the accuracy of the device is at least sufficient to ensure that all contacts with a first row are broken and contacts are made with a second row before any contact with a third row is made. The circuits are designed to operate properly under these conditions regardless of the speed with which the contacts pass from the first, to the second, and to the third rows (said first, second, and third rows meaning any three successive rows (34 – 38) as previously defined, of conductive areas on the same or adjacent number-blocks). Rigid mounting by fasteners 58 and 59 through holes 44 and 45 ensures that contacts 46 – 52 remain correctly aligned with columns 27 – 33 of the number-blocks.

FIG. 6 also shows the mounting position of switch 53, such that its actuating lever 54 is moved by the card as it passes through guide 57.

Figure 7:
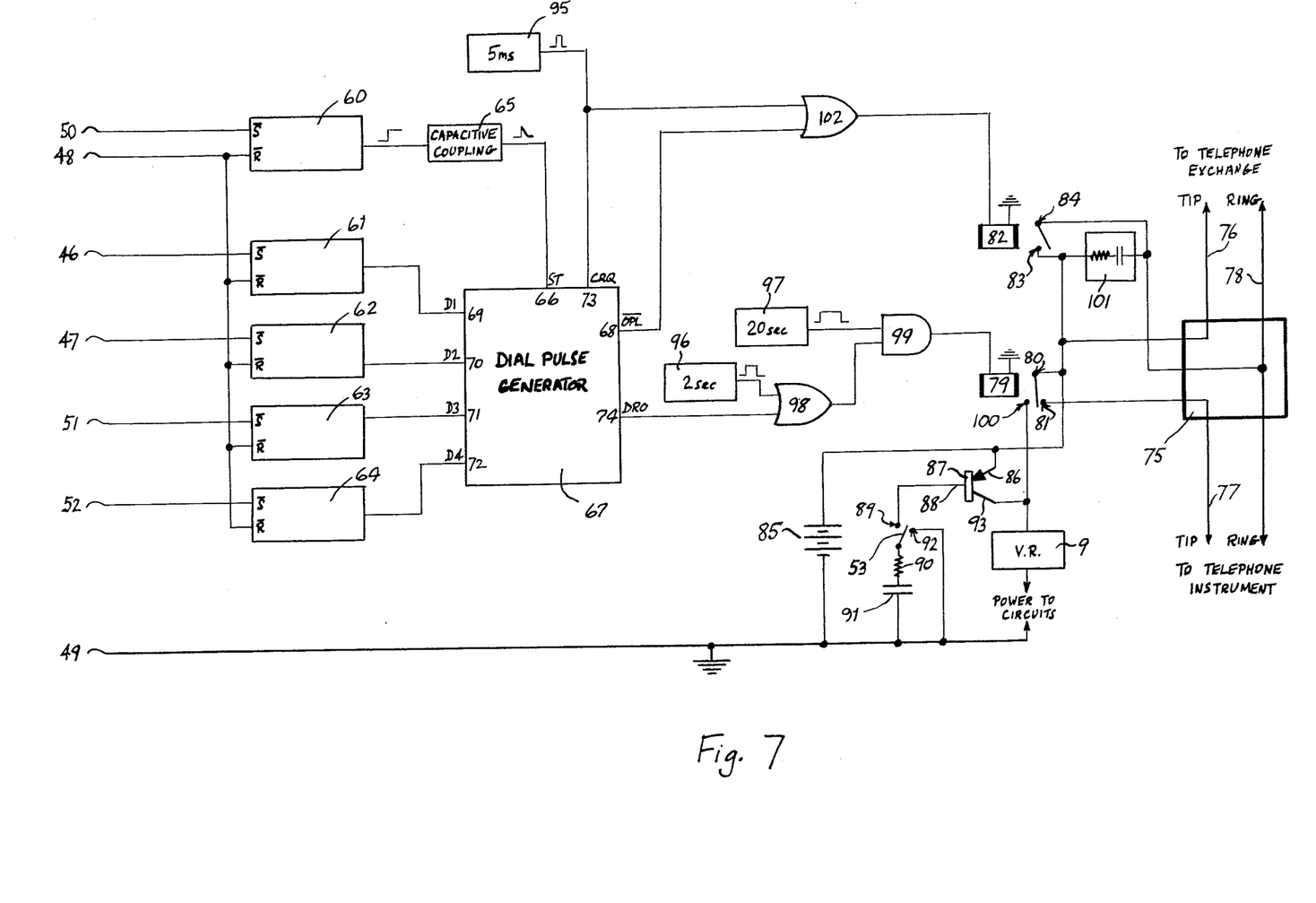
FIG. 7 Block diagram of the electronic dialling means.

FIG. 7 is a block diagram of the electrical circuits by which the coded information on the number-blocks is transformed into dial pulses transmitted to the telephone exchange.

Figure 8:
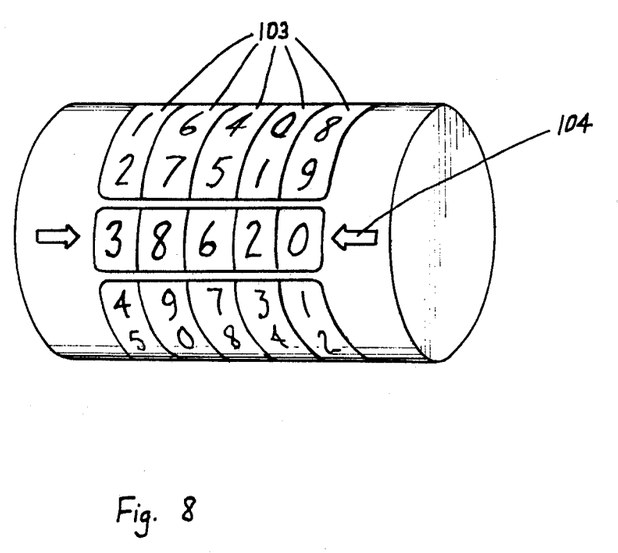
FIG. 8 Alternative embodiment.

FIG. 8 illustrates an alternative embodiment in which each number-block 103 includes visible representations of all the numerals 0 through 9, and may be moved independently of each other number-block until the desired sequence of numbers appears in a position denoted by indicating means 104.

The following paragraphs describe the electrical operation of the device.

Contact 49 is connected to the negative terminal of a battery, which is henceforth called "ground". (Note: it is important to ensure that this ground is not connected to any actual earth ground. It is only "ground" with respect to other parts of the circuits herein described). As the conductive areas of a number block pass over the contacts, column 30 connects to ground through contact 49, thereby causing all conductive areas on the number block (which, as earlier described, are all electrically connected to column 30) to be at ground potential.

The other six contacts 46, 47, 48, 50, 51, 52 connect with the other six columns, and if a conductive surface is present, connect the ground potential thereon with the said contacts and thence to inputs of five bistable latches 60 – 64, as shown in FIG. 7. Latches 60 – 64 are of the $\bar{S}$-$\bar{R}$ type, having an output with two stable states, called "set" and "reset". The "set" state may be achieved by connecting the $\bar{S}$ input to ground, while the $\bar{R}$ input is isolated, and the "reset" state may be achieved by connecting the $\bar{R}$ input to ground, while the $\bar{S}$ input is isolated. The states remain stable after the grounded input is isolated. Latch 60 additionally has the property known as "Schmitt" action, which results in a fast transition between output states, however slowly the input may be grounded.

As any number-block passes over the contacts, rows 38, 37, 36, 35 and 34 are contacted in turn. Row 38 is not germane to the switching action. Its only function is to provide a conductive path to column 33, if such column is to contain a conductive surface. When row 37 is reached, examination of the configuration of the conductive areas reveals that contact 48 is grounded, contact 50 is isolated, and contacts 46, 47, 51 and 52 are isolated only if the digit represented is coded with no conductive surface in the corresponding columns. This results in latch 60 and a certain combination of latches 61 – 64 (depending on the digit represented) being reset.

As row 36 reaches the contacts, the only contacts grounded are such of 46, 47, 51 and 52 that are in contact with a conductive surface coded in columns 33, 32, 28 and 27. The latches corresponding to such contacts are thereupon put into the "set" state. The other latches remain in the "reset" state.

As row 35 reaches the contacts, contact 50 becomes grounded, (contact 48 is already isolated), and consequently latch 60 executes a transition from the reset to the set state.

This transition, which is fast, due to the Schmitt action of latch 60, is coupled through a capacitive coupling network 65 to the "ST" (strobe) input 66 of dial pulse generator circuit 67. Circuit 67 is an integrated circuit manufactured by Motorola Inc. under their part number MC 14408. Its function is to generate a train of lowlogic-level pulses at its "$\overline{OPL}$" output (68), with timing characteristics similar to those of the pulses produced by a rotating telephone dial. The sequence of numerals represented by the pulse train is determined by the states of the four inputs D1, D2, D3 and D4 (69 – 72 respectively) at the moments when strobe pulses are presented at the ST input 66. Circuit 67 must be initialized by a high-to-low transition at its CRQ input 73, at least 3 milliseconds after power is applied. It provides an additional output (DRO, 74) which is low when power is applied, goes high immediately after the first strobe pulse, and goes low again after the complete pulse sequence has been pulsed out. In this and subsequent paragraphs, the terms "high" and "low" refer to two logic level states familiar to those experienced in the electronics art.

The capacitive coupling network 65 converts the transition of the output of latch 60 to the proper timing and voltage levels to be recognized as a strobe pulse at input 66 (as indicated by the waveforms illustrated in FIG. 7 on each side of network 65). At this time the outputs of latches 61 – 64 are in the "set" or "reset" state depending on the code represented by the conductive areas on the number-block. These outputs are connected to inputs 69–72 of circuit 67.

Row 34 is not germane to the switching action. Its only function is to provide a conductive path to column 27, if such column is to contain a conductive surface.

It will be seen from the foregoing description that the electronic circuit design allows some tolerance on the alignment of the row of contacts with the functional sections, or rows, defined on the conductive surface. It is allowable (in fact it is inevitable in practice) for the contacts to be in contact with two adjacent rows at the same time. However, as earlier mentioned, it is not allowable for any two contacts to be simultaneously in contact with conductive areas in any two non-adjacent rows, either on the same number-block or on two adjacent number blocks.

It is also apparent that intermittent contact between the conductive surface and the contacts (which is again inevitable in practice) does not adversely affect the device operation. The effect of the latches is to detect the first contact between the conductive surface and the corresponding contact. Subsequent unintended loss of contact does not affect the state of the latch, while rows 37, 36 and 35 are being traversed. (These rows are the only rows of significance to the switching action).

Furthermore, the action described is quite independent of the speed at which the number-blocks pass over the contacts. This allows the card to be inserted into the console by manual means, at any speed likely to be attained thereby.

The above described process is repeated until all the number-blocks representing an entire telephone number have passed across the contacts. Circuit 67 has the property of storing subsequent codes at a high speed, and generating the corresponding dial pulse sequences at the proper intervals.

Coupling of the dialler to the telephone lines is achieved by means of an adapter 75, illustrated schematically in FIG. 7. Said adapter is connected to two conductors, known conventionally as "tip" and "ring" conductors, which provide the principal electrical path between the telephone instrument and the telephone exchange. Said adapter interrupts the tip conductor and provides separate electrical connections from the dialling device to the part of the tip conductor connected to the telephone exchange (76), and to the part of the tip conductor connected to the telephone instrument (77). Additionally, said adapter provides an electrical connection to the ring conductor (78) which is not interrupted.

The dialling device includes a relay 79, with contacts 80 and 81 which are normally closed (in the absence of power applied to the relay). Said contacts are connected to tip conductors 76 and 77, thus providing that in the absence of power connected to the device (and hence to relay 79), the tip conductor between the telephone exchange and the telephone instrument, though interrupted in adapter 75, is nevertheless connected through relay 79. Additionally, a second relay 82 has contacts 83 and 84 connected to tip and ring conductors 76 and 78. Said contacts 83 and 84 are normally open (in the absence of power applied to the relay), thus providing electrical isolation between the tip and ring conductors. The effect of the relays and adapter in the absence of applied power is therefore to maintain the electrical connections between the telephone exchange and the telephone instrument identical to that which would prevail in the absence of said relays and adapter. Therefore, unless power is applied to said relays, this invention has no effect on the telephone connections and the instrument can be used as if the device were absent.

Desirable objects of a card dialler include:
(a) The dialler should not have any effect on the telephone connections except when it is actually dialling.
(b) The dialler should not require any conscious action on the part of the user to initiate its effect on the telephone connections at the beginning of dialling and to cease its effect at the end of dialling.
(c) The dialler should mute the dialling pulses to prevent them from causing loud clicks in the telephone earpiece.
(d) The dialling should not consume power when not dialling, and should not require conscious action on the part of the user to achieve this object.
(e) The dialler should contain protection against failure modes which would cause to be consumed or the telephone connection to be affected for an indefinite period of time (This would be the case if the dialler failed to stop dialling or to restore the relay contacts to their unpowered position upon completion of dialling).

The presently-described dialler includes several novel means for achieving the above-listed objects.

The source of power is 9-volt battery 85. Its negative terminal is connected to the common circuit point which has been defined as "ground". Its positive terminal is connected via conductor 76 to the tip conductor going to the telephone exchange, to normally-open relay contact 83, to relay contact 80 and hence via normally-closed relay contact 81 and conductor 77 to the tip conductor going to the telephone instrument; and to the emitter 86 of a PNP transistor 87. The base connection 88 of said transistor is connected to the normally-open contact 89 of the previously described switch 53, thus providing that no base current flows in the normal state, and hence that no collector current can flow. There is no path from the tip conductor to "ground" (as "ground" is defined herein), therefore there is no path for power to be drawn from the battery in this state. This state is the state of "not dialling", and satisfies the requirements listed under (a) and (d) above, of drawing no power and having no effect on the telephone connections.

As a card is inserted into the console, it moves switch lever 54 (as may be observed by review of FIG. 6), thereby closing switch 53. This allows base current to pass in transistor 87 through switch contact 89 and resistor 90 into capacitor 91, which is initially discharged, having been connected to ground via resistor 90 and a normally closed contact 92 of switch 53. Passage of base current allows current to flow from the collector 93 of transistor 87 to a voltage regulator 94 and thence to the various circuits and relay coils included in the dialler. Said circuits are so arranged that the coil of relay 82 is energised immediately, thereby closing contacts 83 and 84. This has the effect of connecting the tip and ring conductors, as observed from the telephone exchange, which condition is interpreted by the telephone exchange as an "off-hook" condition.

FIG. 7 shows three one-shot circuits, 95, 96 and 97. All provide a positive pulse starting at the time power is applied, as indicated by the waveform illustrations at the output of each of these circuits, for durations of five milliseconds, two seconds, and 20 seconds respectively.

Circuit 95 provides the necessary delay after power-on before actuating circuit 67. Circuits 96 and 97 go high when power is turned on, coupling through or-gate 98 and and-gate 99 to provide a high level to the coil of relay 79, thus causing contacts 80 and 81 to open. This disconnects the earpiece of the telephone instrument from the dialler, thus effecting the desirable object referenced under (c) above.

Relay 79 has double-throw contacts, thus allowing a normally open contact 100 to be connected to terminal 80, and thence to the battery positive terminal, upon energising said relay. Said connection parallels transistor 87, allowing power to continue to be applied to the circuits and relay coils after capacitor 91 charges to a voltage where insufficient base current is available to enable transistor 87 to continue to supply said power.

As earlier described, circuit 67 produces a sequence of signals at output 68 in the proper time relationships to represent the telephone number to be dialled. Said signals are buffered and applied to the coil of relay 82 in such a way that contacts 83 and 84 open in response to the signals emanating from circuit 67. Said sequential opening of contacts 83 and 84 is observed by the telephone exchange as momentary breaks in continuity between the tip and ring conductors, which are essentially the same as the effect of a normal rotating dial, and which therefore result in the same switching operation at the telephone exchange as would be effected by a rotating dial. (A resistor and a capacitor in series 101 are connected between contacts 83 and 84 to reduce arcing between the contacts at the moment of opening. The resistor and capacitor values are chosen so that they do not impose a significant electrical load on the telephone lines). Or-gate 102 is included to ensure contacts 83 and 84 are closed during the output period of circuit 95, as well as when $\overline{OPL}$ is high. Gates 102 and 99 are suitably buffered to provide sufficient power to drive the relay coils.

Upon completion of dialling, the DRO output 74 of circuit 67 goes low. By this time circuit 96 output is also low, hence a low level is gated into relay 79. This causes contacts 80 and 100 to open, and 80 and 81 to close. This removes power from the circuits and restores normal connection of the tip conductor between the instrument and the telephone exchange. As power is removed from relay 82, its contacts 83 and 84 open, thus removing the short circuit between tip and ring, and allowing communication to proceed between the telephone exchange and the user (provided that the telephone is by that time physically "off-hook"). This sequence occurs without requiring any user action, thus effecting the desirable results listed under (a), (b) and (d) above. Delay circuit 97 is connected by and-gate 98 to turn off relay 79 after 20 seconds, (which is longer than the duration of any correct dialling sequence), in the event circuit 67 fails to negate the DRO signal by that time, thus effecting the desirable result listed in (e) above.

I claim:

1. Card repertory dialler in which each digit of a telephone number is represented on a card by a number-block, each said number-block being capable of individual motion relative to said card, in order to change the telephone number represented by the card as a whole; and in which said cards include restraining means whereby said relative motion may be prevented, in order that the telephone number represented by the card should not change; and identifying means to automatically provide, as a result of moving the number-blocks to represent a particular telephone number, a visual representation of the numerals comprising such telephone number in their correct sequence; and in which said number-blocks include coding means whereby the digit represented by said number-block is expressed in a form suitable for sensing for the purpose of subsequent automatic transmission to the telephone exchange; and which includes sensing means for the accomplishment of said sensing, and transmission means for the accomplishment of said transmission.

2. Card repertory dialler as described in claim 1 in which said identifying means is a visible representation on each number-block of one of the numerals 0 through 9.

3. Card repertory dialler as described in claim 1, in which said number-blocks include visible representations of all the numerals 0 through 9, and in which said identifying means is an indicator which identifies one and only one of said representations depending on the position of said number-block.

4. Card repertory dialler as described in claim 1, in which the cards include means for convenient manual manipulation.

5. Card repertory dialler as described in claim 4, in which said means is a handle.

6. Card repertory dialler as described in claim 1, in which the cards include means for identifying the name of the party whose telephone number is represented by any such card, such identification being visible when said cards are stacked parallel to each other.

7. Card repertory dialler as described in claim 6, in which said means is a writeable surface at the top of the card, said surface making a substantial angle with the plane or axis of the card.

8. Card repertory dialler as described in claim 6, including means for storing cards so that the name of the party whose telephone number is represented by any such card is clearly visible.

9. Card repertory dialler as described in claim 8, in which said means is a rack designed for holding cards essentially parallel with one another.

10. Card repertory dialler as described in claim 1, having electrical means capable of acting in combination with said sensing means at a range of speeds wide enough for sensing to be accomplished as a result of a manually-caused movement of said card relative to said sensing means.

11. Card repertory dialler as described in claim 1, in which said coding means comprises different configurations of an electrically conducting region on a surface of said number-block, which surface includes both electrically conducting and non-conducting regions, and in which said sensing means comprises a set of electrical contacts which pass in contact with said surface as relative motion takes place in a controlled fashion between said card and said sensing means.

12. Card repertory dialler as described in claim 11, in which said electrically conducting region is configured as seven columns, arbitrarily called A, B, C, D, E, F and G, and said set of electrical contacts comprises seven contacts, each of which passes over and makes electrical contact with a different one (and only one) of said seven columns as said relative motion takes place; and in which said relative motion causes said columns of the number-blocks representing the successive digits of the telephone number represented by any card to be passed over and contacted by said contacts in the same sequence that such digits appear in said telephone number; and in which each column of the electrically conducting surface of a given number-block has a definite length which may be considered as divided into five functional sections, called, P, Q, R, S, and T; and in which said relative motion causes said contacts to make electrical contact firstly with section P of all columns of the first number-block, then with section Q of all said columns, followed by sections R, S and T in a similar way, followed by section P of all columns of the next number-block, and so on until all sections of all number-blocks in said card have been contacted in the correct sequence, and in which such relative motion is controlled sufficiently accurately that section P of any column is never contacted simultaneously with sections R or S of any column, neither are sections Q and S or T, nor R and T or P, nor S and P or Q, nor T and Q or R similarly contacted simultaneously; and in which said columns A, B, C and D are individually either electrically conducting or non-conducting in sections Q, R and S in different combinations depending on which of the digits 0 through 9 are coded thereby, said column G is conducting in all sections, said column E is conducting in sections P and Q, and non-conducting in sections R, S, and T, and said column F is conducting in sections S and T and non-conducting in sections P, Q, and R; and in which the whole electrically conducting surface is contiguous, such contiguousness being preserved, when not otherwise provided for, by conducting paths in any column in sections P or T; the function of said electrically conducting region and said set of electrical contacts being to convert the coded digits of the telephone number to electrical signals in a form suitable for interpretation by subsequent electrical circuits, in a reliable and economical way, and in a way that is not dependent on the speed at which such relative motion takes place, and in a way that does not require perfect continuous contact as said contacts move relative to said conducting regions.

13. Card repertory dialler as described in claim 10, in which said electrical means includes an electrically conducting region on each card configured as seven columns, arbitrarily called A, B, C, D, E, F and G, and said sensing means comprises seven contacts, each of which passes over and makes electrical contact with a different one (and only one) of said seven columns as relative motion takes place between said card and said contacts; and in which said relative motion causes said columns of each number-block representing the successive digits of the telephone number represented by any card to be passed over and contacted by said contacts in the same sequence that such digits appear in said telephone number; and in which each column of the electrically conducting surface of a given number-block has a definite length which may be considered as divided into five functional sections, called P, Q, R, S and T; and in which said relative motion causes said contacts to make electrical contact firstly with section P of all columns of the first number-block, then with section Q of all said columns, followed by sections R, S and T in a similar way, followed by section P of all columns of the next number-block, and so on until all sections of all number-blocks in said card have been contacted in the correct sequence, and in which such relative motion is controlled sufficiently accurately that section P of any column is never contacted simultaneously with sections R or S of any column, neither are sections Q and S or T, nor R and T or P, nor S and P or Q, nor T and Q or R similarly contacted simultaneously; and in which said columns A, B, C and D are individually either electrically conducting or non-conducting in sections Q, R and S in different combinations depending on which of the digits 0 through 9 are coded thereby; said column G is conducting in all sections, said column E is conducting in sections P and Q, and non-conducting in sections R, S and T, and said column F is conducting in sections S and T, and non-conducting in sections P, Q and R; and in which the whole electrically conducting surface is contiguous; and in which said electrical means includes bistable latches, four of which are caused to enter a known state (described arbitrarily as the "set" state) by the individual effect on the corresponding four electrical contacts of conductive surfaces on columns A, B, C and D, and a fifth of which is caused to enter the set state by the effect of a conductive surface on column E, and to enter the opposite state (the "reset" state) by the effect of a conductive surface on column F, and in which the states of the fifth latch and the transition therebetween are used to reset the first four latches prior to their being set as stated above, and to transfer the states of said latches after they have been set (if the corresponding column A, B, C or D is conducting) to subsequent parts of the electrical circuits; the purpose of the action described in this claim being to prevent faulty operation due to intermittent contact of said contacts with said conducting surfaces, as well as to define an electrical means of accomplishing the result claimed in claim 10.

14. Card repertory dialler as described in claim 1, including means for automatically restoring the telephone wire connections to the condition that would exist in the absence of said dialler (except for a resistor-capacitor network having no significant effect on telephone operation), after the first of the two events defined by (a) completion of dialling, and (b) a fixed time period after initiation of dialling in excess of that normally taken to complete dialling.

15. Card repertory dialler as described in claim 14, including switching means for causing the power consumption of said dialler to essentially cease at the time such telephone wire connections are so restored, and isolating means for isolating the telephone earpiece from the direct effect of dialling signals transmitted to the telephone exchange.

16. Card repertory dialler as described in claim 15, in which said switching means comprises a transistor, whose base is connected at the initiation of dialling to a capacitive source of charge, which provides said transistor with substantial base current for a time period less than that normally required for dialling, thereby allowing the transistor to deliver collector current only for such short time period; a first relay, with two contacts which are open in the absence of applied power, and which are caused to close after initiation of dialling, and before said transistor ceases to conduct, said contact and said transistor emitter and base terminals being connected in parallel between the power source and the circuits of said dialler in such a way that said circuits are powered only when either said transistor is conducting or said contacts are closed; and an electronic circuit which detects the earlier of the two events defined by (a) completion of dialling, and (b) a fixed time period after initiation of dialling, and upon such detection causes said contacts to open; and in which said isolating means comprises an adapter which breaks the tip conductor into two parts, one leading to the telephone exchange, and the other leading to the telephone instrument, a second relay with two contacts which are closed in the absence of applied power, and which are connected individually to said two parts of said tip conductor, and an electronic circuit which causes the contacts of said second relay to be open when the contacts of said first relay are closed, and vice versa.

17. Card repertory dialler as defined in claim 16, in which said first and second relays are combined in one double-throw relay, with its common terminal connected both to the source of power and to the tip conductor leading to the telephone exchange.

18. Card repertory dialler as described in claim 14, in which said restoring means comprises a first relay, with contacts which are connected between the tip and ring conductors leading to the telephone exchange, (in parallel with a resistor-capacitor network having no significant effect on telephone operation), which breaks the tip-conductor into two parts, one leading to the telephone exchange and the other leading to the telephone instrument, a second relay with two contacts connected individually to said two parts of said tip conductor, and an electronic circuit which detects the earlier of two events defined by (a) completion of dialling, and (b) a fixed time period after initiation of dialling, and upon such detection causes the contacts of said first relay to open and the contacts of said second relay to close.

19. Card repertory dialler as described in claim 1 in which said transmission means is a relay, with contacts which are connected between the tip and ring conductors leading to the telephone exchange, and which open and close in the correct time relationship to simulate dialling signals.

20. Card repertory dialler as described in claim 1, in which said restraining means comprises (a) a cover which may be fastened to said card by inserting two lower tabs on the cover into corresponding holes in the card, and two upper tabs on the cover into corresponding holes in the card and in which the tabs are so dimensioned that all four tabs can remain in their respective holes simultaneously, and in which said cover includes resilient material which exerts pressure on said cover and thereby causes projections on the upper tabs to pass into suitably positioned holes in the card body, for the purpose of locking said cover in place (until such time as it is deliberately removed by reversing the procedure for fastening it); and (b) rigid stops and boundaries surrounding the required position of said number-blocks to restrain said number blocks for movement in the two directions in which movement is not restrained by said cover.

* * * * *